US011132314B2

(12) United States Patent
Maddukuri et al.

(10) Patent No.: US 11,132,314 B2
(45) Date of Patent: Sep. 28, 2021

(54) SYSTEM AND METHOD TO REDUCE HOST INTERRUPTS FOR NON-CRITICAL ERRORS

(71) Applicant: DELL PRODUCTS, LP, Round Rock, TX (US)

(72) Inventors: Akkiah Maddukuri, Austin, TX (US); Arun Muthaiyan, Round Rock, TX (US); Jordan Chin, Austin, TX (US); Timothy M. Lambert, Austin, TX (US); Nasiha Hrustemovic, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/798,744

(22) Filed: Feb. 24, 2020

(65) Prior Publication Data

US 2021/0263868 A1    Aug. 26, 2021

(51) Int. Cl.
*G06F 13/24*    (2006.01)
*G06F 11/07*    (2006.01)

(52) U.S. Cl.
CPC .......... *G06F 13/24* (2013.01); *G06F 11/0745* (2013.01); *G06F 11/0793* (2013.01)

(58) Field of Classification Search
CPC .. G06F 13/24; G06F 11/0745; G06F 11/0793; G06F 11/0772
See application file for complete search history.

(56) References Cited

U.S. PATENT DOCUMENTS

| | | | |
|---|---|---|---|
| 6,212,592 B1* | 4/2001 | Klein | G06F 13/26 710/260 |
| 7,552,359 B2* | 6/2009 | Takemori | G06F 11/0724 714/11 |
| 7,596,648 B2* | 9/2009 | Ramgarajan | G06F 11/073 710/263 |
| 7,721,034 B2* | 5/2010 | Wang | G06F 9/4812 710/266 |
| 8,122,176 B2* | 2/2012 | Wang | G06F 11/2284 710/261 |
| 8,478,923 B2* | 7/2013 | Dasari | G06F 9/4812 710/266 |
| 9,141,454 B2* | 9/2015 | Raj | G06F 11/0772 |
| 9,148,337 B2 | 9/2015 | Sawal et al. | |
| 9,529,750 B2 | 12/2016 | Maity et al. | |
| 2007/0088988 A1* | 4/2007 | Gupta | G06F 11/3648 714/48 |
| 2007/0239917 A1* | 10/2007 | Orita | G06F 13/24 710/268 |
| 2012/0159028 A1* | 6/2012 | Zimmer | G06F 9/4812 710/261 |
| 2017/0102985 A1* | 4/2017 | Song | G06F 11/079 |

* cited by examiner

*Primary Examiner* — Brian T Misiura
(74) *Attorney, Agent, or Firm* — Larson Newman, LLP (57) ABSTRACT

An information handling system includes a device, a processor, and a runtime agent. the device provides a System Management Interrupt (SMI) in response to an error on the device. The processor receives the SMI, enters a System Management Mode (SMM), and executes first interrupt handler code in SMM to provide interrupt information associated with the SMI when the SMI is associated with a non-critical error on the device, and exit SMM to a runtime mode. The runtime agent receives the interrupt information during the runtime mode to execute second interrupt handler code to service the non-critical error on the device.

15 Claims, 5 Drawing Sheets

SYSTEM AND METHOD TO REDUCE HOST INTERRUPTS FOR NON-CRITICAL ERRORS

FIELD OF THE DISCLOSURE

This disclosure generally relates to information handling systems, and more particularly relates to reducing host interrupts for non-critical errors in an information handling system.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

An information handling system may include a device, a processor, and a runtime agent. The device may provide a System Management Interrupt (SMI) in response to an error on the device. The processor may receive the SMI, enter a System Management Mode (SMM), and execute first interrupt handler code in SMM to provide interrupt information associated with the SMI when the SMI is associated with a non-critical error on the device, and to exit SMM to a runtime mode. The runtime agent may receive the interrupt information during the runtime mode to execute second interrupt handler code to service the non-critical error on the device.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
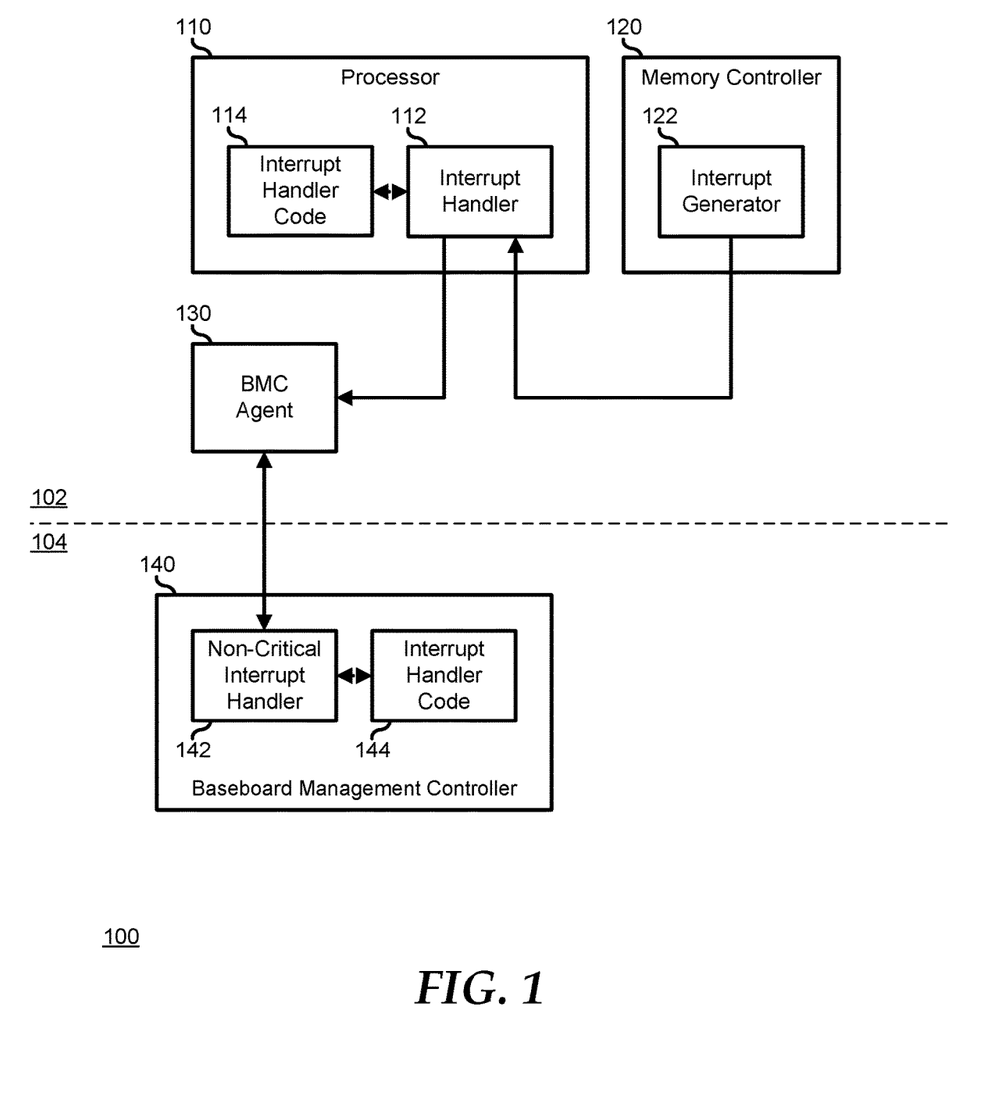
FIG. 1 is a block diagram illustrating an information handling system according to an embodiment of the present disclosure.

FIG. 1 illustrates an information handling system 100, including a host processing system 102 and a management system 104. Host processing system 102 represents hardware, firmware, and software components that are typically associated with a computer or other information handing system, and includes a processor 110, a memory controller 120, and a baseboard management controller (BMC) agent 130. Processor 110 represents one or more central processing units (CPUs), processor cores, or other processing devices. Processor 110 may also be understood to represent other devices typical of an information handling system such as information handling system 100, and that are utilized to perform the processing tasks of the information handling system, such as initializing and configuring the information handling system under a basic input/output system (BIOS) or a Universal Extensible Firmware Interface (UEFI), loading and executing an operating system (OS), and loading and executing applications programs, software, utilities, and the like. As such, processor 110 may be understood to include memory devices such as read-only memory (ROM) devices, random access memory (RAM) devices, FLASH memory devices, and the like, data storage devices such as disk drives, solid-state drives (SSDs), and the like, input/output (I/O) devices such as network interface devices, storage interface devices, and the like, human interface devices such as a keyboard, a mouse, a display device, and the like. Processor 110 includes an interrupt handler 112, and error handling code 114 that is executed by the processor in response to the interrupt handler receiving an interrupt. Interrupts will be more fully described below.

Management system 104 represents one or more processing devices, such as a dedicated BMC System-on-a-Chip (SoC) device, one or more associated memory devices, one or more network interface devices, a complex programmable logic device (CPLD), and the like, that operate together to provide a management environment for information handling system 100. Management system 104 includes a BMC 140, and is connected to various components of host processing system 102 via various internal communication interfaces to provide an out-of-band (OOB)

mechanism to retrieve information related to the operation of the host processing system, to provide BIOS/UEFI or system firmware updates, to manage non-processing components of information handling system 100, such as system cooling fans and power supplies. For example, BMC 140 can be connected to host one or more elements of host processing system 102 via a Low Pin Count (LPC) interface, an Inter-Integrated-Circuit (I2C) interface, an I3C interface, a PCIe interface, or the like. An example of BMC 140 may include a commercially available BMC product or other device that operates in accordance with an Intelligent Platform Management Initiative (IPMI) specification, a Web Services Management (WSMan) interface, a Redfish Application Programming Interface (API), another Distributed Management Task Force (DMTF), or other management standard, and can include an Integrated Dell Remote Access Controller (iDRAC), an Embedded Controller (EC), or the like. Management system 104 may include additional memory devices, logic devices, security devices, or the like, as needed or desired. BMC 140 includes a non-critical interrupt handler 142 and interrupt handler code 114, as described further below.

Memory controller 120 represents a portion of information handling system 100 that operates to manage the flow of information to the main memory of the information handling system. Memory controller 120 operates in accordance with a particular memory architecture implemented on information handling system 100. For example, memory controller 120 may operate in accordance with a Double-Data Rate (DDR) standard, such as a JEDEC DDR4 or DDR5 standard. Memory controller 120 may be understood to represent a separate component of information handling system 100, or may be integrated with other components of the information handling system, such as with processor 110, as needed or desired. Memory controller 120 operates to detect when a memory transaction between the memory controller and the main memory suffers memory errors. For example, memory transactions may be provided with error correcting code (ECC) bits that ensure that the data contents of a memory transaction is correctly transmitted and received, and that can typically permit for the correction of single- or double-bit errors and for the detection of triple-bit errors.

Memory controller 120 includes an interrupt generator 122 that provides an interrupt to interrupt handler 112 in response to memory errors detected by memory controller 120. For example, memory controller 120 may correct correctable errors on memory transactions where data is received from the system memory, and the system memory may correct correctable errors on memory transactions where data is sent to the system memory. Here, memory controller 120 may implement an algorithm, such as a leaky-bucket algorithm, that takes into account a rate at which correctable errors occur, on which memory device in the system memory the errors occur, or other information as needed or desired. Here further, memory controller 120 may only direct interrupt generator 122 to provide an interrupt when the algorithm indicates that the number of correctable errors exceeds a threshold. On the other hand, memory controller 120 may direct interrupt generator 122 to provide an interrupt any time an uncorrectable error is detected.

In response to an interrupt, interrupt handler operates to determine the source of the interrupt and the type of interrupt, and to direct processor 110 to execute code from interrupt handler code 114 that is associated with the determined source and type of the interrupt. For example, when the interrupt is a correctable error interrupt from interrupt generator 122, interrupt handler 112 can direct processor 120 to execute code from interrupt handler code 114 that operates to perform repair procedures on the main memory, such as to perform a post-package repair on a memory device of the system memory, or other repair procedures, as needed or desired. In another case, when the interrupt is an uncorrectable error interrupt from interrupt generator 122, interrupt handler 112 can direct processor 120 to execute code from interrupt handler code 114 that operates to perform an exception handler, as needed or desired.

In a particular embodiment, a machine check architecture (MCA) for information handling system 100 is implemented that provides for all errors, both correctable and uncorrectable, to be delivered to a Basic Input/Output System (BIOS) of the information handling system, and for the BIOS to prioritize such interrupts ahead of operating system (OS) of virtual machine manager (VMM) interrupts. Here, the BIOS operates to log all detected errors, to provide predictive failure analysis (PFA) on the detected errors, and to schedule any needed remediation for subsequent reboots of the information handling system, such as memory post-package repair (PPR) operations, and the like. Here, a BIOS System Management Mode (SMM) handler operates to generate a highest priority System Management Interrupt (SMI) to interrupt handler 112 to execute interrupt handler code 114 to address the error. However, a SMI is broadcast to processor 110, and to all other processors or cores of information handling system 100, and all processors enter SMM, halting normal program execution on all OS and user threads, while a designated processor, here processor 100, executes interrupt handler code 114 to address the error. Thus, when a SMI is received and the processors and cores of information handling system 100 enter SMM, the performance level of the information handling system is greatly diminished, particularly when interrupt handler code 114 requires extensive execution time to address the error that generated the SMI.

However, some errors are not critical to the continuing operation of information handling system 100, and others are critical. An example of a critical error may include an error that needs to be handled completely in order to avoid crashing information handling system 100, such as an uncorrectable memory error, a faulty machine state, and the like. An example of a non-critical error may include an error that does not need to he handled completely to avoid crashing information handling system 100, such as a correctable error, a correctable error count exceeding a threshold, an I/O device timeout, and the like. In a particular embodiment, when a SMI is generated for a particular non-critical error, interrupt handler code 114 associated with the non-critical error is not implemented to fully address the error, but instead the interrupt handler code associated with the non-critical error operates to pass the handling of the non-critical error to a runtime agent, and to quickly exit SMM. The runtime agent then executes code as needed to address the error when processor 110 exits SMM. In this way, the amount of time spent in SMM addressing non-critical errors is decreased, and the performance of information handling system 100 is improved. Note that processor 110 may still be utilized to execute the code needed to address the error, and so there may still be a performance hit in addressing the non-critical error. However, this performance hit is greatly offset by the fact that all other processors and cores of information handling system 100 also exit SMM and can then resume the processing of OS and user threads.

In another embodiment, the performance hit associated with having the runtime agent execute the code needed to address the non-critical error is further reduced by passing the handling of the non-critical error to BMC agent 130. Here, BMC agent provides a low-overhead solution, in that the BMC agent does not actually perform the actions needed to address the non-critical error, but passes information associated with the non-critical error to a non-critical interrupt handler 142 of BMC 140, and the BMC executes interrupt handler code 144 to perform the actions needed to address the non-critical error. In this way, the bulk of the processing needed to address non-critical errors is performed out-of-band from processor 110 and the hosted operating environment, and the performance hit to information handling system 100 due to non-critical errors is limited to the short duration of time the information handling system is in SMM to redirect processing to BMC agent 130, and the runtime processing needed to pass the non-critical error information from the BC agent to non-critical interrupt handler 142. The non-critical error information includes sufficient information to identify the source and type of the non-critical error, and any other information needed by BMC 140 to address the non-critical error. In particular, BMC 140 may perform the PFA activities, the remedial actions, and the like, thereby further offloading processing tasks from processor 110. In a particular embodiment, where BMC 140 needs to receive information related to the operating state of information handling system 100, the BMC directly reads the information from processor 110. For example, BMC 140 can read Machine Check Machine Specific Registers (MSRs) via a management bus such as a Platform Environment Control Interface (PECI) interface, or the like.

Figure 2:
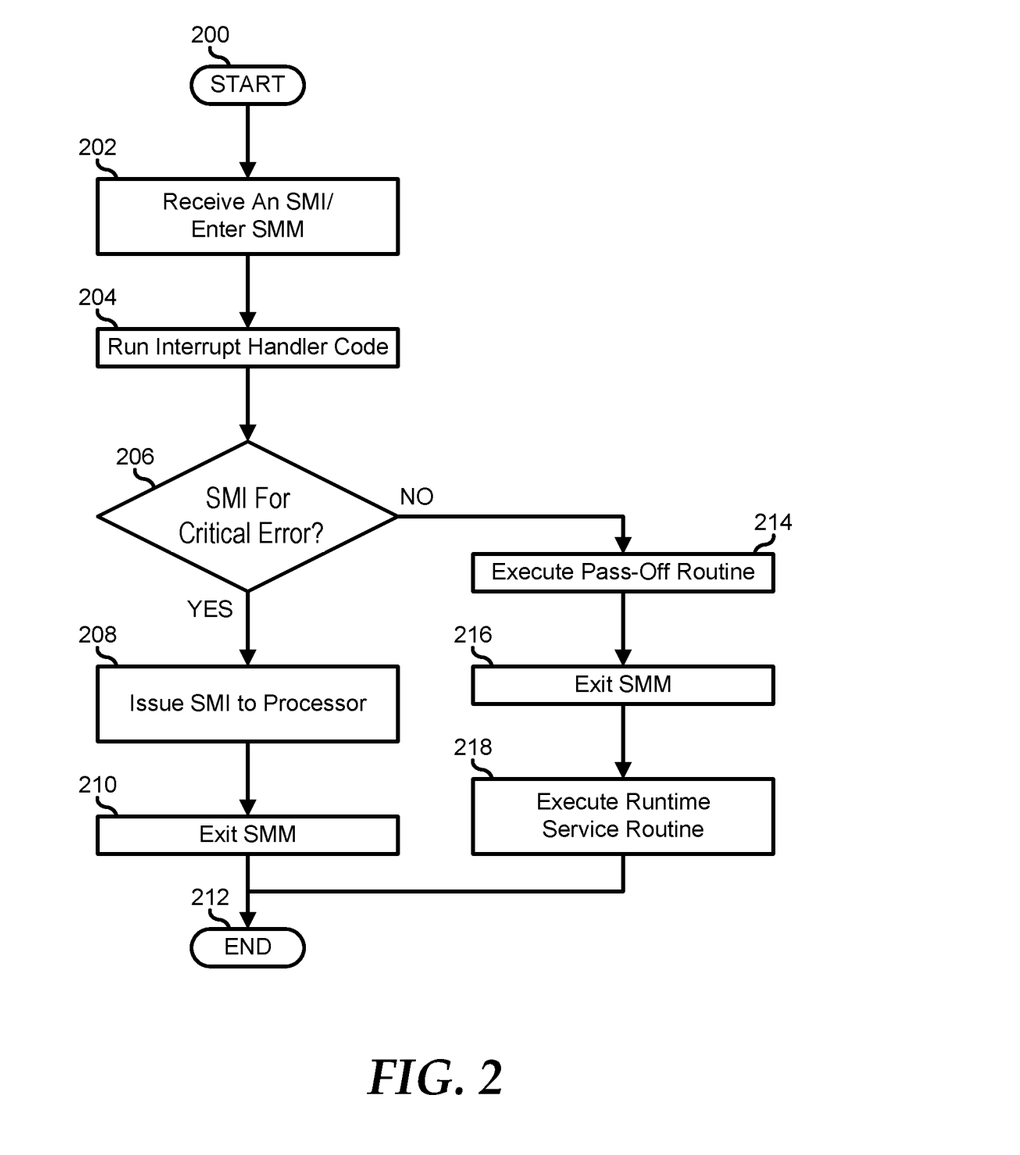
FIG. 2 illustrates a method to reduce host interrupts for non-critical errors in the information handling system of FIG. 1.

FIG. 2 illustrates a method for to reducing host interrupts for non-critical errors in an information handling system similar to information handling system 100, starting at block 200. An SMI is received at a processor, and the information handling system enters an SMM mode in block 202. The processor runs interrupt handler code associated with the interrupt in block 204. The interrupt handler code makes a determination as to whether or not the interrupt is for a critical error on the information handling system in decision block 206. If so, the "YES" branch of decision block 206 is taken and the interrupt handler code is executed to run the service routine with the processor remaining in SMM in block 208. Then, when the service routine is done, SMM is exited in block 210, and the method ends in block 212.

If the interrupt handler code determines that the interrupt is not for a critical error on the information handling system, the "NO" branch of decision block 206 is taken, the interrupt handler code is executed to pass the interrupt to a runtime agent in block 214, and SMM is exited in block 216. The runtime agent executes the interrupt service routine in runtime in block 218, and the method ends in block 212.

Figure 3:
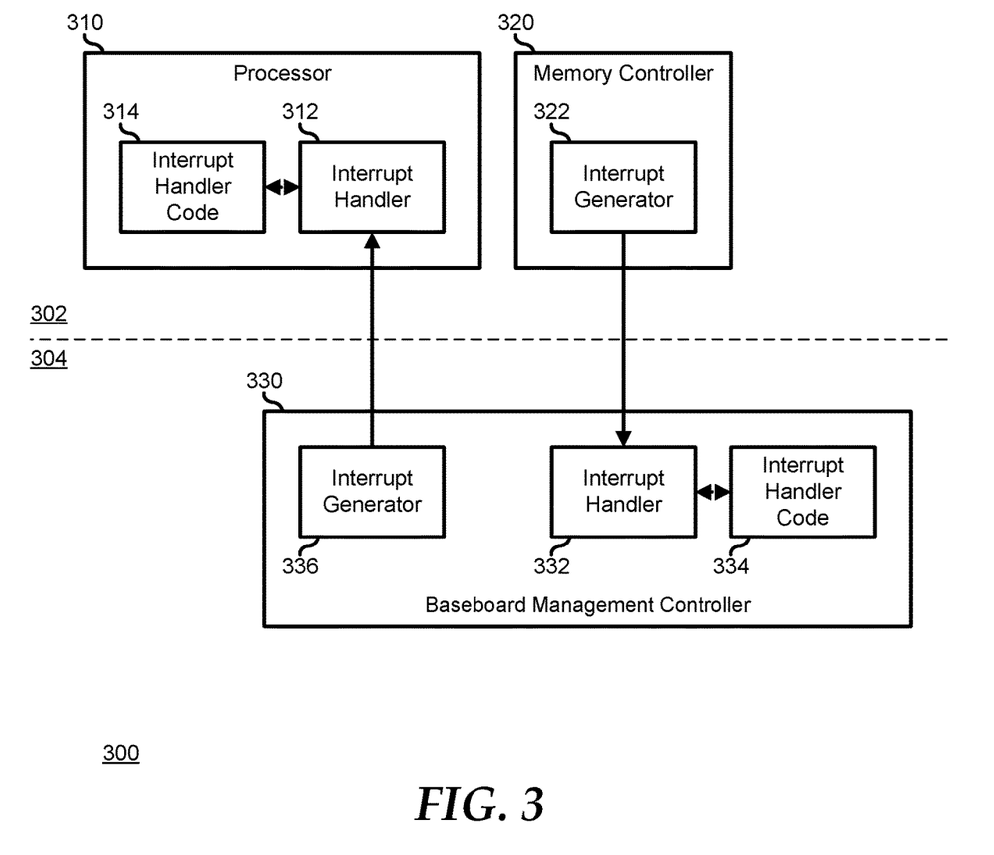
FIG. 3 illustrates a method for optimizing hardware resources for optimal workload performance in an information handling system in accordance with an embodiment of the present disclosure.

FIG. 3 illustrates an information handling system 300 similar to information handling system 100, and including a host processing system 302 and a management system 304. Host processing system 302 is similar to host processing system 102, and includes a processor 310 similar to processor 110, and a memory controller 320 similar to memory controller 120. Management system 304 is similar to management system 104, and includes a BMC 330 similar to BMC 140. Processor 310 includes an interrupt handler 312 similar to interrupt handler 112, and interrupt handler code 314 similar to interrupt handler code 114. Memory controller 320 includes an interrupt generator 322 similar to interrupt generator 122. BMC 330 includes an interrupt handler 332, interrupt handler code 334, and an interrupt generator 336, as described below.

Information handling system 300 represents a MCA that differs from the MCA represented in information handling system 100. In information handling system 100, the MCA is typical for information handling systems where all SMIs are routed to processor 110, and where such routings are fixed in the hardware and firmware architecture of the information handling system, but where some interrupts are handled by BMC 140. In information handling system 300, the MCA is modified in that interrupts from interrupt generator 322 are routed directly to interrupt handler 332 in BMC 332. Here, BMC 330 operates to perform the selecting process of where to handle various interrupts. As such, when interrupt handler 332 receives an interrupt, the interrupt handler executes interrupt handler code 334 to determine if the interrupt is related to a critical error or to a non-critical error. If the interrupt is related to a critical error, interrupt handler code 334 directs interrupt generator 336 to issue a SMI to interrupt handler 312 in processor 310, and the processor enters SMM, executes interrupt handler code 314 to service the interrupt and exits SMM, as described above. If the interrupt is related to a non-critical error, interrupt handler 332 executes interrupt handler code 334 to perform the actions needed to address the non-critical error. In this way, information handling system 300 operates to only enter SMM for interrupts that are related to critical errors. Here, interrupt handler code 334 operates to quickly determine that the interrupt from interrupt generator 322 is related to a critical error and interrupt generator 336 quickly issues the SMI. As such the performance hit to information handling system 300 is less than that experienced by information handling system 100 where all error events are received by the interrupt handler and are sorted in SMM.

Figure 4:
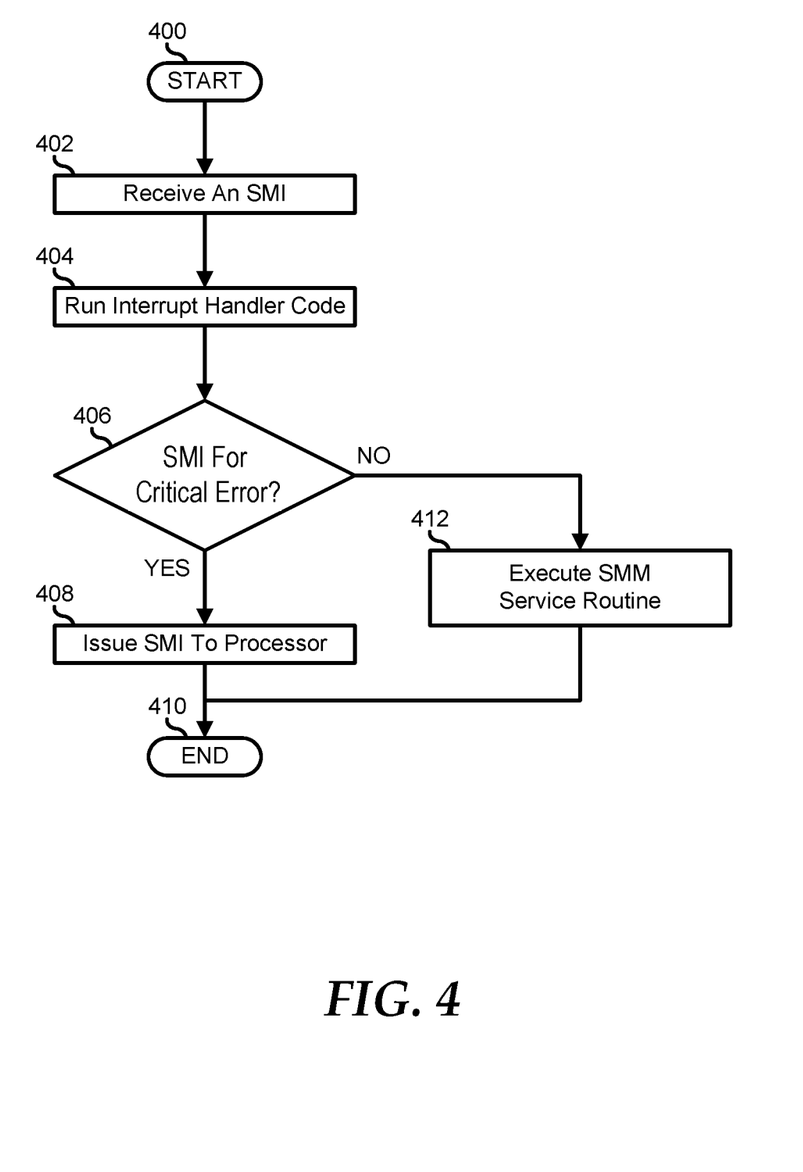
FIG. 4 illustrates a method to reduce host interrupts for non-critical errors in the information handling system of FIG. 3.

FIG. 4 illustrates a method for to reducing host interrupts for non-critical errors in an information handling system similar to information handling system 300, starting at block 400. A SMI is received at a BMC block 402. The BMC runs interrupt handler code associated with the interrupt in block 404. The interrupt handler code makes a determination as to whether or not the interrupt is for a critical error on the information handling system in decision block 406. If so, the "YES" branch of decision block 406 is taken and the interrupt handler code is executed to issue a SMI to a processor of the information handling system in block 408, and the processor handles the interrupt normally, and the method ends in block 410. If the interrupt handler code determines that the interrupt is not for a critical error on the information handling system, the "NO" branch of decision block 406 is taken, the interrupt handler code is executed execute the interrupt service routine out-of-band in block 412, and the method ends in block 410.

In the preceding embodiments, interrupt handler code is show as being included with a processor or a BMC, but this is not necessarily so. In particular, interrupt handler code may be located in any memory storage device of the associated host processing system or management system, as needed or desired. Also in the preceding embodiments, interrupts are illustrated in the context of critical and non-critical events that occur on a memory controller, but this is not necessarily so. In particular, it should be understood that the teachings of the present disclosure may be utilized more broadly with respect to other critical and non-critical events on an information handling system, as needed or desired, and that such other critical and non-critical events are specifically included in the teachings of the present disclosure.

Figure 5:
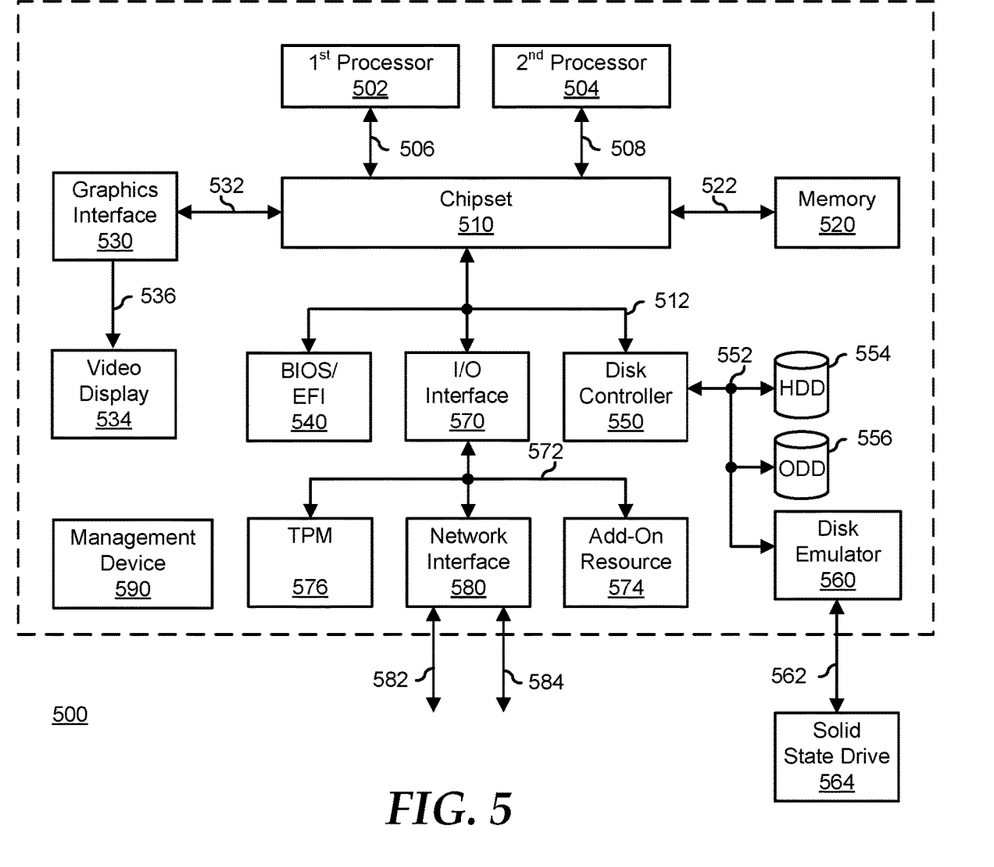
FIG. 5 is a block diagram illustrating an information handling system according to another embodiment of the present disclosure.

FIG. 5 illustrates a generalized embodiment of an information handling system 500 similar to information handling system 100. For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 500 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 500 can include processing resources for executing machine-executable code, such as a central processing unit (CPU), a programmable logic array (PLA), an embedded device such as a System-on-a-Chip (SoC), or other control logic hardware. Information handling system 500 can also include one or more computer-readable medium for storing machine-executable code, such as software or data. Additional components of information handling system 500 can include one or more storage devices that can store machine-executable code, one or more communications ports for communicating with external devices, and various input and output (I/O) devices, such as a keyboard, a mouse, and a video display. Information handling system 500 can also include one or more buses operable to transmit information between the various hardware components.

Information handling system 500 can include devices or modules that embody one or more of the devices or modules described below, and operates to perform one or more of the methods described below. Information handling system 500 includes a processors 502 and 504, a chipset 510, a memory 520, a graphics interface 530, a basic input and output system/universal extensible firmware interface (BIOS/UEFI) module 540, a disk controller 550, a hard disk drive (HDD) 554, an optical disk drive (ODD) 556, a disk emulator 560 connected to an external solid state drive (SSD) 562, an input/output (I/O) interface 570, one or more add-on resources 574, a trusted platform module (TPM) 576, a network interface 580, a management device 590, and a power supply 595. Processors 502 and 504, chipset 510, memory 520, graphics interface 530, BIOS/UEFI module 540, disk controller 550, HDD 554, ODD 556, disk emulator 560, SSD 562, I/O interface 570, add-on resources 574, TPM 576, and network interface 580 operate together to provide a host environment of information handling system 500 that operates to provide the data processing functionality of the information handling system. The host environment operates to execute machine-executable code, including platform BIOS/UEFI code, device firmware, operating system code, applications, programs, and the like, to perform the data processing tasks associated with information handling system 500.

In the host environment, processor 502 is connected to chipset 510 via processor interface 506, and processor 504 is connected to the chipset via processor interface 508. Memory 520 is connected to chipset 510 via a memory bus 522. Graphics interface 530 is connected to chipset 510 via a graphics interface 532, and provides a video display output 536 to a video display 534. In a particular embodiment, information handling system 500 includes separate memories that are dedicated to each of processors 502 and 504 via separate memory interfaces. An example of memory 520 includes random access memory (RAM) such as static RAM (SRAM), dynamic RAM (DRAM), non-volatile RAM (NV-RAM), or the like, read only memory (ROM), another type of memory, or a combination thereof.

BIOS/UEFI module 540, disk controller 550, and I/O interface 570 are connected to chipset 510 via an I/O channel 512. An example of I/O channel 512 includes a Peripheral Component Interconnect (PCI) interface, a PCI-Extended (PCI-X) interface, a high speed PCI-Express (PCIe) interface, another industry standard or proprietary communication interface, or a combination thereof. Chipset 510 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/UEFI module 540 includes BIOS/UEFI code operable to detect resources within information handling system 500, to provide drivers for the resources, initialize the resources, and access the resources. BIOS/UEFI module 540 includes code that operates to detect resources within information handling system 500, to provide drivers for the resources, to initialize the resources, and to access the resources.

Disk controller 550 includes a disk interface 552 that connects the disk controller to HDD 554, to ODD 556, and to disk emulator 560. An example of disk interface 552 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 560 permits SSD 564 to be connected to information handling system 500 via an external interface 562. An example of external interface 562 includes a USB interface, an IEEE 1394 (Firewire) interface, a proprietary interface, or a combination thereof. Alternatively, solid-state drive 564 can be disposed within information handling system 500.

I/O interface 570 includes a peripheral interface 572 that connects the I/O interface to add-on resource 574, to TPM 576, and to network interface 580. Peripheral interface 572 can be the same type of interface as I/O channel 512, or can be a different type of interface. As such, I/O interface 570 extends the capacity of I/O channel 512 when peripheral interface 572 and the I/O channel are of the same type, and the I/O interface translates information from a format suitable to the I/O channel to a format suitable to the peripheral channel 572 when they are of a different type. Add-on resource 574 can include a data storage system, an additional graphics interface, a network interface card (NIC), a sound/video processing card, another add-on resource, or a combination thereof. Add-on resource 574 can be on a main circuit board, on separate circuit board or add-in card disposed within information handling system 500, a device that is external to the information handling system, or a combination thereof.

Network interface 580 represents a NIC disposed within information handling system 500, on a main circuit board of the information handling system, integrated onto another component such as chipset 510, in another suitable location, or a combination thereof. Network interface device 580 includes network channels 582 and 584 that provide interfaces to devices that are external to information handling system 500. In a particular embodiment, network channels 582 and 584 are of a different type than peripheral channel 572 and network interface 580 translates information from a format suitable to the peripheral channel to a format suitable to external devices. An example of network channels 582 and 584 includes InfiniBand channels, Fibre Channel channels, Gigabit Ethernet channels, proprietary channel architectures, or a combination thereof. Network channels 582 and 584 can be connected to external network resources (not illustrated). The network resource can include another information handling system, a data storage system, another network, a grid management system, another suitable resource, or a combination thereof.

Management device 590 represents one or more processing devices, such as a dedicated baseboard management controller (BMC) System-on-a-Chip (SoC) device, one or more associated memory devices, one or more network interface devices, a complex programmable logic device (CPLD), and the like, that operate together to provide the management environment for information handling system 500. In particular, management device 590 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 500, such as system cooling fans and power supplies. Management device 590 can include a network connection to an external management system, and the management device can communicate with the management system to report status information for information handling system 500, to receive BIOS/UEFI or system firmware updates, or to perform other task for managing and controlling the operation of information handling system 500. Management device 590 can operate off of a separate power plane from the components of the host environment so that the management device receives power to manage information handling system 500 when the information handling system is otherwise shut down. An example of management device 590 include a commercially available BMC product or other device that operates in accordance with an Intelligent Platform Management Initiative (IPMI) specification, a Web Services Management (WSMan) interface, a Redfish Application Programming Interface (API), another Distributed Management Task Force (DMTF), or other management standard, and can include an Integrated Dell Remote Access Controller (iDRAC), an Embedded Controller (EC), or the like. Management device 590 may further include associated memory devices, logic devices, security devices, or the like, as needed or desired. An example of BMC 150 may.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system, comprising:
    a baseboard management controller;
    a device configured to provide a System Management Interrupt (SMI) in response to an error on the device;
    a processor configured to receive the SMI, to enter a System Management Mode (SMM) in response to receiving the SMI, and to execute first interrupt handler code in SMM, wherein the first interrupt handler code operates to:
        determine that the SMI is associated with a non-critical error on the device;
        provide interrupt information associated with the SMI in response to determining that the SMI is associated with the non-critical error on the device; and
        exit SMM to a runtime mode; and
    a runtime agent configured to receive the interrupt information during the runtime mode and to provide the interrupt information to the baseboard management controller to execute second interrupt handler code to service the non-critical error on the device;
    wherein in executing the second interrupt handler code, the baseboard management controller is configured to read a Machine Specific Register of the processor via a Platform Environment Control Interface.

2. The information handling system of claim 1, wherein the first interrupt handler code further operates to:
    determine that the SMI is associated with a critical error on the device;
    service the critical error on the device; and
    exit SMM to the runtime mode.

3. The information handling system of claim 1, wherein the device comprises a memory controller.

4. The information handling system of claim 3, wherein the memory controller is configured to provide the SMI in response to an uncorrectable memory error, and wherein the uncorrectable memory error is a critical error.

5. The information handling system of claim 3, wherein the memory controller is configured to provide the SMI in response to a correctable memory error, and wherein the correctable memory error is the non-critical error.

6. A method, comprising:
    receiving, by a processor of an information handling system, a System Management Interrupt (SMI) in response to an error on a device of the information handling system;
    entering a System Management Mode (SMM) in response to receiving the SMI;
    executing first interrupt handler code in SMM, wherein in executing the first interrupt handler code, the method further comprises:
        determining that the SMI is associated with a non-critical error on the device;
        providing interrupt information associated with the SMI in response to determining that the SMI is associated with the non-critical error on the device; and
        exiting SMM to a runtime mode;
    receiving, by a runtime agent of the information handling system, the interrupt information during the runtime mode;
    receiving, by a baseboard management controller of the information handling system, the interrupt information from the runtime agent;

executing, by the information handling system, second interrupt handler code to service the non-critical error on the device; and reading, by the baseboard management controller, a Machine Specific Register of the processor via a Platform Environment Control Interface in response to receiving the interrupt information.

7. The method of claim 6, further comprising:

determining, by the first interrupt handler code, that the SMI is associated with a critical error on the device;

servicing, by the first interrupt handler, the critical error on the device; and exiting SMM to the runtime mode.

8. The method of claim 6, wherein the device comprises a memory controller.

9. The method of claim 8, wherein the memory controller is configured to provide the SMI in response to an uncorrectable memory error, and wherein the uncorrectable memory error is a critical error.

10. The method of claim 8, wherein the memory controller is configured to provide the SMI in response to a correctable memory error, and wherein the correctable memory error is the non-critical error.

11. An information handling system, comprising:

a device configured to provide an interrupt in response to an error on the device;

a baseboard management controller configured to receive the interrupt from the device, and to execute first interrupt handler code to:

determine that the interrupt is associated with a non-critical error on the device;

service the non-critical error on the device in response to determining that the interrupt is associated with the non-critical error;

determine that the interrupt is associated with a critical error on the device;

provide a System Management Interrupt (SMI) associated with the critical error in response to determining that the interrupt is associated with the critical error; and read a Machine Specific Register of the processor via a Platform Environment Control Interface in response to receiving the interrupt; and a processor configured to enter a System Management Mode (SMM) in response to receiving the SMI, and to execute second interrupt handler code in SMM, wherein the second interrupt handler code operates to:

service the critical error on the device; and exit SMM.

12. The information handling system of claim 11, wherein the device comprises a memory controller.

13. The information handling system of claim 12, wherein the memory controller is configured to provide the SMI in response to an uncorrectable memory error.

14. The information handling system of claim 13, wherein the memory controller is configured to provide the SMI in response to a correctable memory error.

15. The information handling system of claim 14, wherein the uncorrectable memory error is the critical error, and wherein the correctable memory error is the non-critical error.

* * * * *